(12) United States Patent
Morita et al.

(10) Patent No.: US 7,845,451 B2
(45) Date of Patent: Dec. 7, 2010

(54) MOTORCYCLE FRAME STRUCTURE

(75) Inventors: Kenji Morita, Saitama (JP); Jun Hariu, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 115 days.

(21) Appl. No.: 12/378,701

(22) Filed: Feb. 18, 2009

(65) Prior Publication Data

US 2009/0242313 A1 Oct. 1, 2009

(30) Foreign Application Priority Data

Mar. 31, 2008 (JP) ............................... 2008-092854

(51) Int. Cl.
*B62K 11/04* (2006.01)
(52) U.S. Cl. ..................................... 180/219
(58) Field of Classification Search ................. 180/219
See application file for complete search history.

(56) References Cited

U.S. PATENT DOCUMENTS

| 4,852,678 | A | * | 8/1989 | Yamaguchi | 180/219 |
| 4,887,687 | A | * | 12/1989 | Asai et al. | 180/219 |
| 4,911,474 | A | * | 3/1990 | Fukuda | 280/835 |
| 6,371,236 | B1 | * | 4/2002 | Fukunaga | 180/219 |
| 6,695,330 | B2 | * | 2/2004 | Hata | 280/152.3 |
| 7,004,276 | B2 | * | 2/2006 | Iizuka et al. | 180/89.17 |
| 7,044,253 | B2 | * | 5/2006 | Takenaka et al. | 180/219 |
| 2006/0076175 | A1 | * | 4/2006 | Yamakura et al. | 180/219 |
| 2008/0060864 | A1 | * | 3/2008 | Arai | 180/219 |
| 2008/0110155 | A1 | * | 5/2008 | Harada | 60/276 |
| 2008/0110688 | A1 | * | 5/2008 | Miyashiro et al. | 180/311 |
| 2008/0314677 | A1 | * | 12/2008 | Shiozaki et al. | 180/366 |
| 2009/0114466 | A1 | * | 5/2009 | Nishijima et al. | 180/219 |

FOREIGN PATENT DOCUMENTS

| EP | 1 652 766 A2 | | 5/2006 |
| EP | 1652766 A2 | * | 5/2006 |
| JP | 2000-072075 | | 3/2000 |
| JP | 2000072075 A | * | 3/2000 |
| JP | 2003-081166 | | 3/2003 |
| JP | 2003081166 A | * | 3/2003 |
| JP | 2006-015963 | | 1/2006 |

* cited by examiner

*Primary Examiner*—Lesley Morris
*Assistant Examiner*—Michael R Stabley
(74) *Attorney, Agent, or Firm*—Carrier Blackman & Associates, P.C.; Joseph P. Carrier; William D. Blackman

(57) ABSTRACT

A motorcycle frame structure includes pivot plates at rear portions of left and right main frames extending rearwardly and downwardly from a head pipe. A seat rail is fastened to an upper portion of the pivot plate at two positions which are vertically spaced apart from each other, and also at the front end of the seat rail. A first attachment portion and a second attachment portion are attached to a front end of the seat rail. The first attachment portion is fastened to the pivot plate from the horizontally external side of the seat rail with a first bolt, and laterally overlaps a rear upper lateral surface of the pivot plate. The second attachment portion is fastened to the pivot plate from the rear side of the pivot plate with a second bolt, and overlaps a rear portion of the pivot plate.

18 Claims, 11 Drawing Sheets

MOTORCYCLE FRAME STRUCTURE

CROSS-REFERENCE TO RELATED APPLICATIONS

The present invention claims priority under 35 USC 119 based on Japanese patent application No. 2008-092854, filed on Mar. 31, 2008. The entire subject matter of this priority document, including specification, claims and drawings, is incorporated by reference herein.

BACKGROUND OF THE INVENTION

1. Technical Field of the Invention

The present invention relates to a motorcycle frame structure. More particularly, the present invention relates to a body frame of a motorcycle in which a pivot plate, vertically and swingably supporting a front portion of a swing arm which is rotatably supporting a rear wheel at a rear portion, is provided at a rear portion of each of a plurality of main frames extending rearward and downward from a head pipe which is steerably supporting a front fork and a steering handlebar, and a front end of a seat rail is fastened to an upper portion of the pivot plate at two positions of a front end vertically spaced apart from each other.

2. Background Art

A conventional motorcycle body frame is known in which two upper and lower front ends of the seat rail are laterally put on the rear portion of a pivot plate and are fastened with a bolt to the pivot plate from the left-right direction outside of the body frame. A frame of this known design is described in Japanese Laid-open Patent No. 2003-81166.

Incidentally, the fastened portion of the seat rail to the pivot plate needs strength to withstand a load applied to the seat rail from above. As disclosed in Japanese Laid-open Patent No. 2003-81166 mentioned above, the configuration in which the two upper and lower front ends of the seat rail are fastened to the pivot plate from the left-right direction outside of the body frame needs to increase the rigidity of a boss attached to the pivot plate in order to ensure the strength of such a fastened portion. This increases the thickness of the attachment boss, which leads to an increase in the weight of the pivot plate.

Although the known motorcycle frame has some utility for its intended purposes, a need still exists in the art for an improved motorcycle frame structure. In particular, there is a need for an improved motorcycle frame structure in which a front end of a seat rail can firmly be fastened to a pivot plate while preventing an increase in the weight of the pivot plate.

SUMMARY OF THE INVENTION

It is, accordingly, an object of the present invention, to provide a motorcycle frame structure in which a front end of a seat rail can firmly be fastened to a pivot plate while preventing an increase in the weight of the pivot plate. To achieve the foregoing object, according to a first aspect and feature of the present invention, a motorcycle frame structure is provided in which a pivot plate, vertically and swingably supporting a front portion of a swing arm which is rotatably supporting a rear wheel at a rear portion, is provided at a rear portion of each of a plurality of left and right main frames extending from a head pipe which is steerably supporting a front fork and a steering handlebar and a front end of a seat rail is fastened to two positions of an upper portion of the pivot plate, the two positions being vertically spaced apart from each other, a first attachment portion laterally overlapping a rear upper lateral surface of the pivot plate and a second attachment portion disposed below the first attachment portion to overlap a rear surface of a rear portion of the pivot plate from the rear are attached to the front end of the seat rail, and the first attachment portion is fastened to the pivot plate from the horizontally external side of the seat rail with a first bolt, and the second attachment portion is fastened to the pivot plate from the rear side of the pivot plate with a second bolt.

According to the above arrangement, the second attachment portion is disposed below the first attachment portion to overlap the rear surface of the rear portion of the pivot plate from the rear is fastened to the pivot plate from the rear side of the pivot plate with the second bolt. Therefore, a load applied to the second bolt resulting from a load applied to the seat rail from above becomes extremely small. Thus, the pivot plate needs only to be provided with a simple screw hole adapted to receive the second bolt screwed thereinto, at a portion corresponding to the second attachment portion. Consequently, it is possible to firmly fasten the front end of the seat rail to the pivot plate while preventing a weight increase due to the increased thickness of the pivot plate at a portion corresponding to the second attachment portion of the seat rail.

According to a second feature and aspect of the present invention, in addition to the first aspect and feature of the present invention, the pivot plates are provided with a pair of respective left and right to-be-attached portions to which a pair of the first left and right attachment portions are respectively attached, and with a cross member connecting both the to-be-attached portions, and the cross member is formed with a cushion support portion supporting an upper end portion of the rear cushion.

In the above arrangement, the cushion support portion sufficiently ensuring strength and rigidity and the pair of left and right to-be-attached portions can be commoditized to ensure the attachment portion rigidity of the seat rail to the pivot plate without increasing weight.

According to a third aspect and feature of the present invention, in addition to the first and second aspects and features, the front end of the seat rail is formed to externally overlap a rear portion of the pivot plate as viewed from the side.

In the above arrangement, the front end of the seat rail externally overlaps the rear portion of the pivot plate as viewed from the side. Therefore, the horizontal attachment rigidity of the seat rail to the pivot plate is improved and the pivot plate can be looked thin relative to the seat rail to enhance external appearance.

According to a fourth aspect and feature of the present invention, in addition to any of the first through third aspects and features, a pair of the left and right seat rails are joined together to constitute a seat rail assembly, and the seat rail assembly is formed with a box-like portion disposed at a position connecting a pair of the left and right second attachment portions together when the seat rail assembly is viewed from the rear.

In the above arrangement, the pair of left and right seat rails are joined together to constitute the seat rail assembly, and the seat rail assembly is formed with the box-like portion disposed at a position connecting a pair of the left and right second attachment portions when the seat rail assembly is viewed from the rear. Therefore, a load applied to the second attachment portions resulting from a twist in the seat rails can be reduced by action of the box-like portion to reduce a load applied to the pivot plate, thereby further reducing the weight of the pivot plate.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF THE EXEMPLARY EMBODIMENT

A selected exemplary embodiment of the present invention will now be described, with reference to the drawings. Throughout this description, relative terms like "front", "rear", "longitudinal," "crosswise," "vertical," and the like are used in reference to a vantage point of an operator of the vehicle, seated on the driver's seat and facing forward. It should be understood that these terms are used for purposes of illustration, and are not intended to limit the invention.

Figure 1:
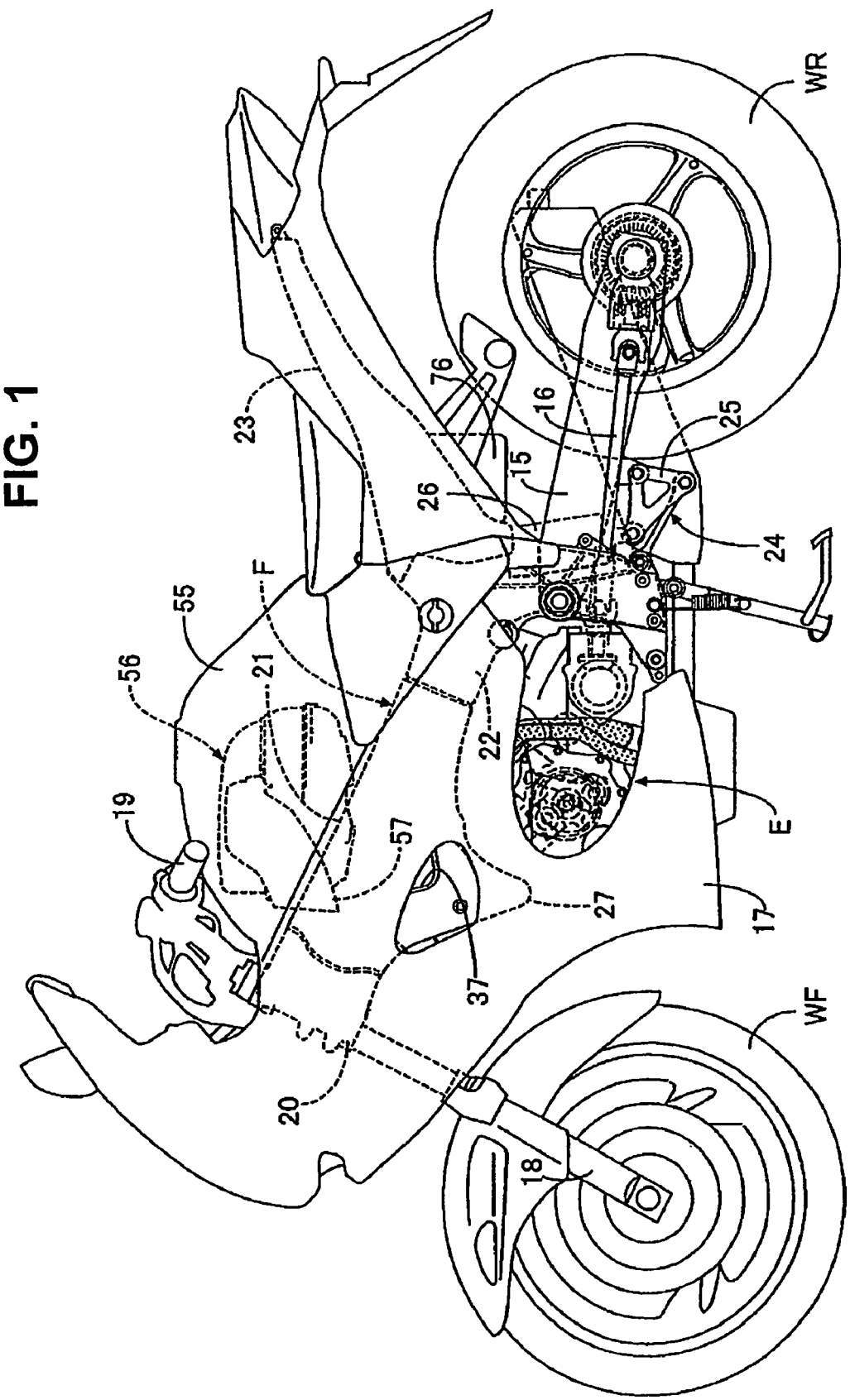
FIG. 1 is a lateral view of a motorcycle according to an exemplary embodiment of the present invention.

Referring first to FIG. 1, for example, a 4-cylinder V-type engine E is mounted on a vehicle frame F of a motorcycle. A rear wheel WR is rotatably supported by the rear portion of a swing arm 15 vertically swingably carried by the body frame F. Power of the engine E is transmitted to the rear wheel WR via a drive shaft 16 extending back and forth. A portion of the engine E and the body frame F are covered by a body cover 17, which is mounted to the body frame F.

Figure 2:
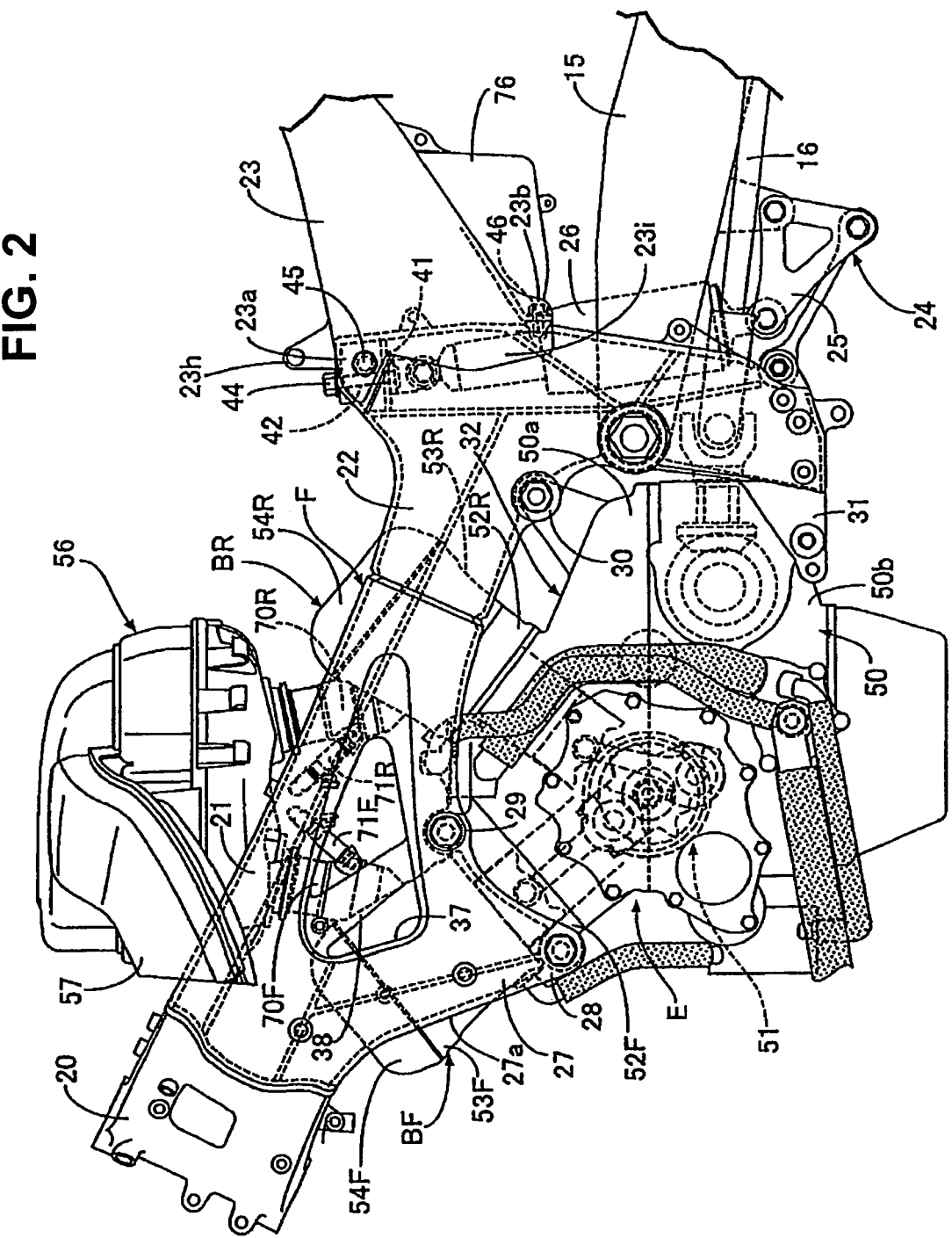
FIG. 2 is an enlarged lateral view of a major portion of FIG. 1 with a body cover omitted.
Figure 3:
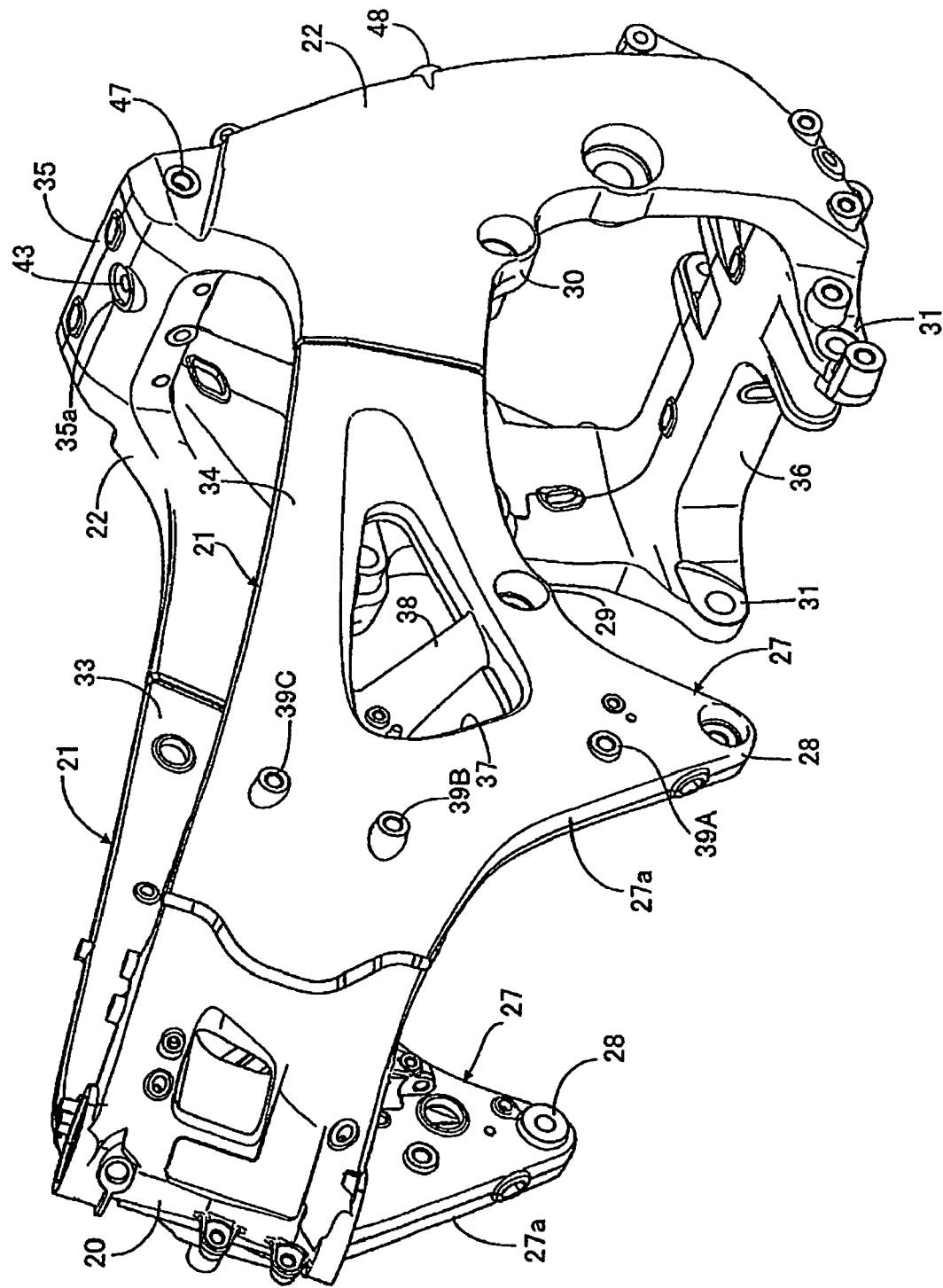
FIG. 3 is a perspective view illustrating a head pipe, main frame sections, and pivot plates according to an exemplary embodiment of the present invention.
Figure 4:
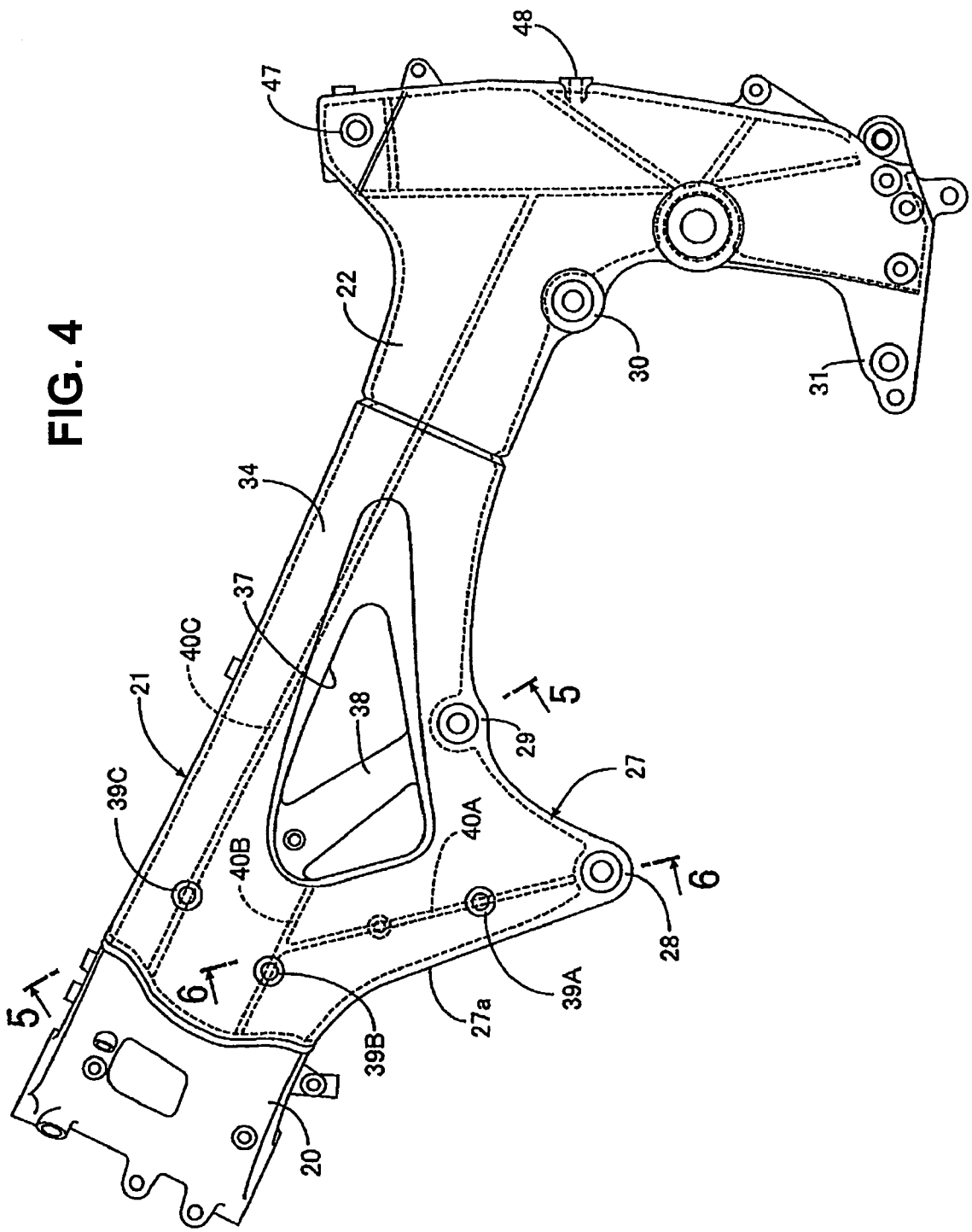
FIG. 4 is a lateral view illustrating the head pipe, main frame sections and pivot plates according to an exemplary embodiment of the present invention.

With additional reference to FIGS. 2 to 4, the body frame F includes a head pipe 20 steerably supporting a front fork 18 rotatably supporting a front wheel WF and a steering handlebar 19; a pair of left and right main frame sections 21 extending rearward and downward from the head pipe 20; a pair of left and right pivot plates 22 connected to the rear portions of the main frame sections 21 and extending downward; and a pair of left and right seat rails 23 connected at front ends to the upper portions of the pivot plates 22 and extending rearward upward. The rear wheel WR is rotatably supported by the rear portion of the swing arm 15 swingably supported at a front end by the pivot plates 22. In addition, a link mechanism 24 is provided between the lower portion of one of both the pivot plates 22 and the front portion of the swing arm 15. A rear cushion unit 26 is provided between the body frame F and a link member 25 constituting part of the link mechanism 24.

The main frame sections 21 are provided integrally with engine hangers 27 hanging downward from intermediate portions of the main frame sections 21. An engine main body 32 of the engine E is suspended by and mounted to the engine hangers 27 and the pivot plates 22. Specifically, first and second engine support portions 28 and 29 are integrally provided at the lowermost portions and rear upper portions, respectively, of the engine hangers 27. In addition, third and fourth engine support portions 30 and 31 are integrally provided at the upper portions and lower portions, respectively, of the pivot plates 22. The engine main body 32 is supported by the engine support portions 28, 29, 30, 31.

Figure 5:
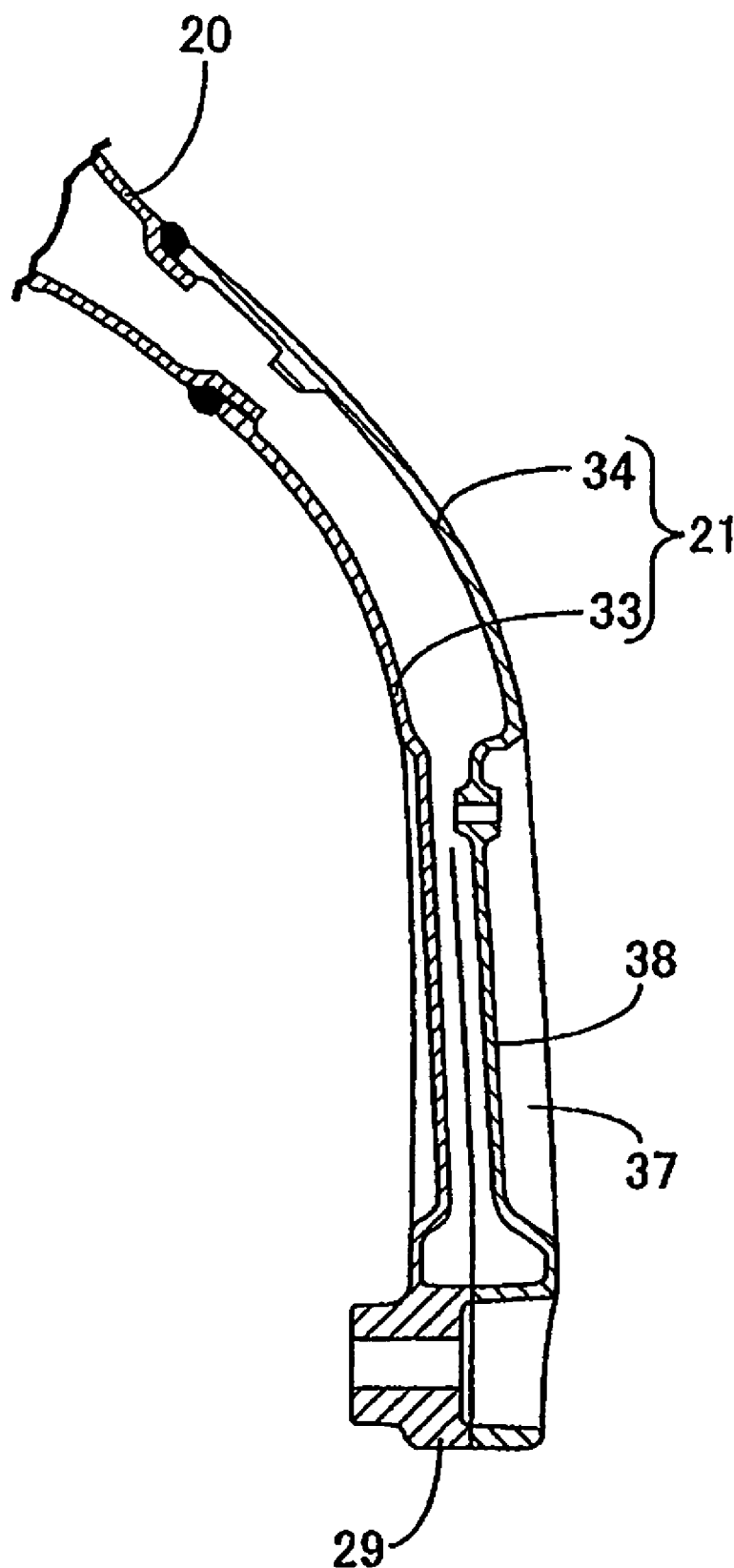
FIG. 5 is a cross-sectional view taken along line 5-5 of FIG. 4.
Figure 6:
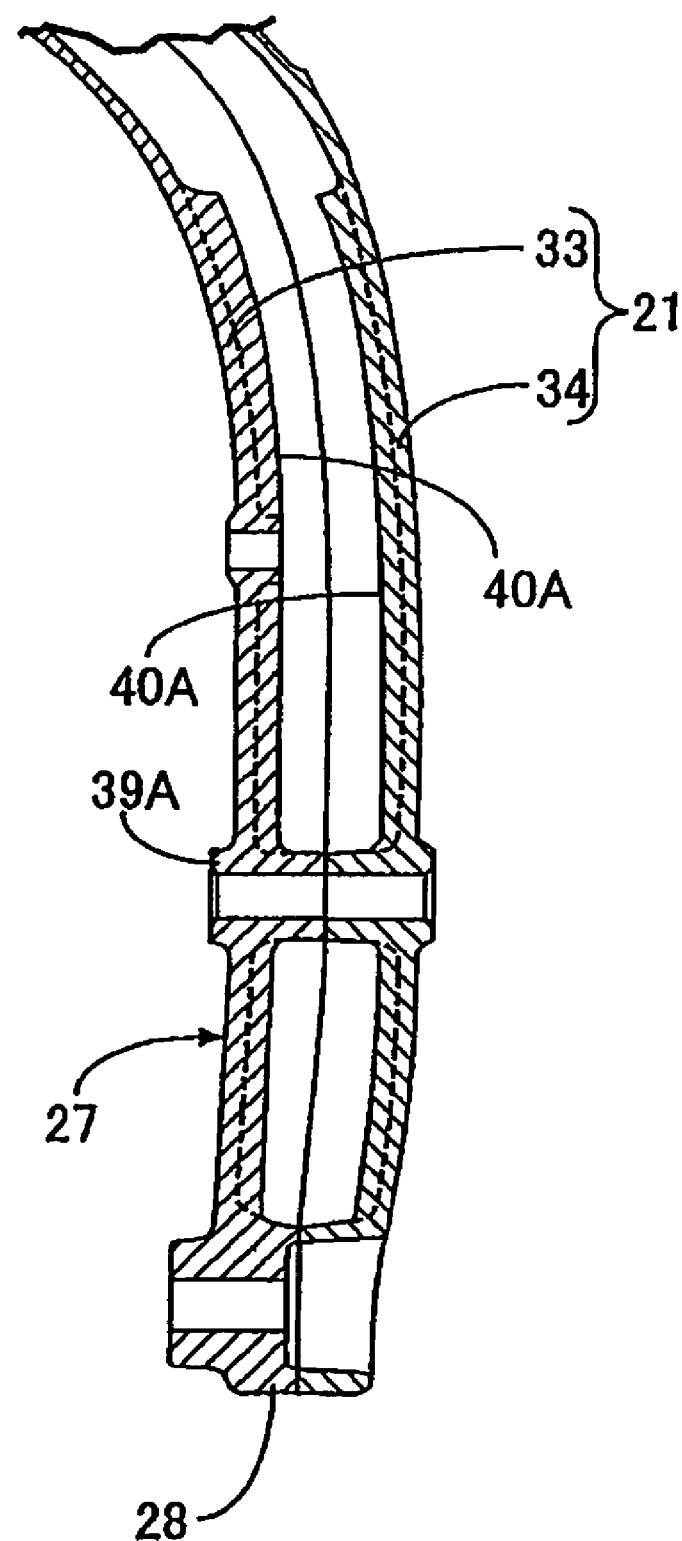
FIG. 6 is a cross-sectional view taken along line 6-6 of FIG. 4.

Referring to FIGS. 5 and 6, the main frame sections 21 are each formed hollow by joining together two frame members 33, 34 subjected to press working. The front ends of the main frame sections 21 are welded to the head pipe 20. Similarly, also the engine hangers 27 integral with the main frame sections 21 are each formed hollow by joining together the two frame members 33, 34. The pivot plates 22 are welded to the rear portions of the pair of main frame sections 21 and extend vertically. The upper portions of both the pivot plates 22 are integrally connected to each other by an upper cross member 35. The lower portions of both the pivot plates 22 are integrally connected to each other by a lower cross member 36.

The engine hangers 27 are each integrally continuous with an intermediate portion of the main frame 21 to extend downwardly therefrom. A front edge 27a of the engine hanger 27 is formed to be inclined forwardly and upwardly toward the head pipe 20. In addition, both frame members 33, 34 of the main frame sections 21 are provided at upper portions of the engine hangers 27 with through-holes 37 to reduce the weight of the main frame sections 21. The main frame sections 21 are each provided with a reinforcing portion 38 which extends generally parallel to the front edge 27a of the engine hanger 27 so as to longitudinally traverse the through-hole 37. The second engine support portion 29 is provided on the extension of the reinforcing portion 38 and at the lower portion of the engine hanger 27 in order to carry the engine main body 32.

A plurality of, e.g. three, attachment bosses 39A, 39B, 39C are provided on each of the main frame sections 21 including the engine hangers 27 in order to attach a vehicle constituting component, e.g., the body cover 17 thereto. Ribs 40A, 40A are integrally provided on the inner surfaces of the two frame members 33, 34 constituting the main frame sections 21 and the engine hangers 27. As shown in FIG. 6, each of the ribs 40A, 40A connect the first engine supporting portion 28 located at the lowermost portion of the engine hanger 27, the attachment bosses 39A, 39B and the head pipe 20 together. In addition, the rib 40B connecting the attachment boss 39B with the head pipe 20 and the rib 40C connecting the attachment boss 39C with the head pipe 20 are integrally provided close to the main frame sections 21 and on the inner surfaces of both the frame members 33, 34. The ribs 40A, 40B and 40C can increase the rigidity of the main frame sections 21 and engine hangers 27 per se and reduce vibration sound transmitted from the body cover 17 to the main frame sections 21 and to the engine hangers 27.

In addition, as illustrated in FIG. 6, each of the attachment bosses 39A, 39B, 39C is provided between the rear and front frame members 33, 34 of each of the main frame sections 21 and of each of the engine hangers 27.

Incidentally, the upper cross member 35 integrally connecting the respective upper portions of both the pivot plates 22 is formed at a central portion with a cushion support portion 35a for supporting the upper end of the rear cushion 26. In addition, the cushion support portion 35a is provided with an insertion hole 43. In this way, this insertion hole 43 receives an upper portion of a bolt 42 passed therethrough. The bolt 42 is engaged from below with the cushion support member 41 connected to the upper end of the rear cushion unit 26 to pass through the cushion support member 41. A nut 44 is screwed to the portion of the bolt 42 projecting upward from the insertion hole 43. Thus, the upper end of the rear cushion unit 26 is connected to and supported by the upper cross member 35 of the body frame F.

The seat rails 23 are each fastened at a front end portion to the upper portion of the pivot plate 22 at two positions vertically spaced apart from each other. The front end portion of each seat rail 23 is provided with a first attachment portion 23a and a second attachment portion 23b. The first attachment portion 23a is provided to laterally overlap a rear upper lateral surface of the pivot plate 22. The second attachment portion 23b is disposed below the first attachment portion 23a to overlap from rearward the rear surface of the rear portion of the pivot plate 22.

On the other hand, the pivot plates 22 are each provided at rear upper portions with attachment bosses 47 adapted to each receive a first bolt 45 screwed thereinto, the first bolt 45 being inserted into the first attachment portion 23a from the horizontal outside of the body frame F. In addition, both the bosses 47 are connected to each other by the upper cross member 35. The pivot plates 22 are each provided at a rear surface of the rear portion with a screw hole 48 adapted to receive a second bolt 46 screwed thereinto, the second bolt 46 being inserted into each of the second attachment portions 23b from the rear side of the body frame F.

Figure 7:
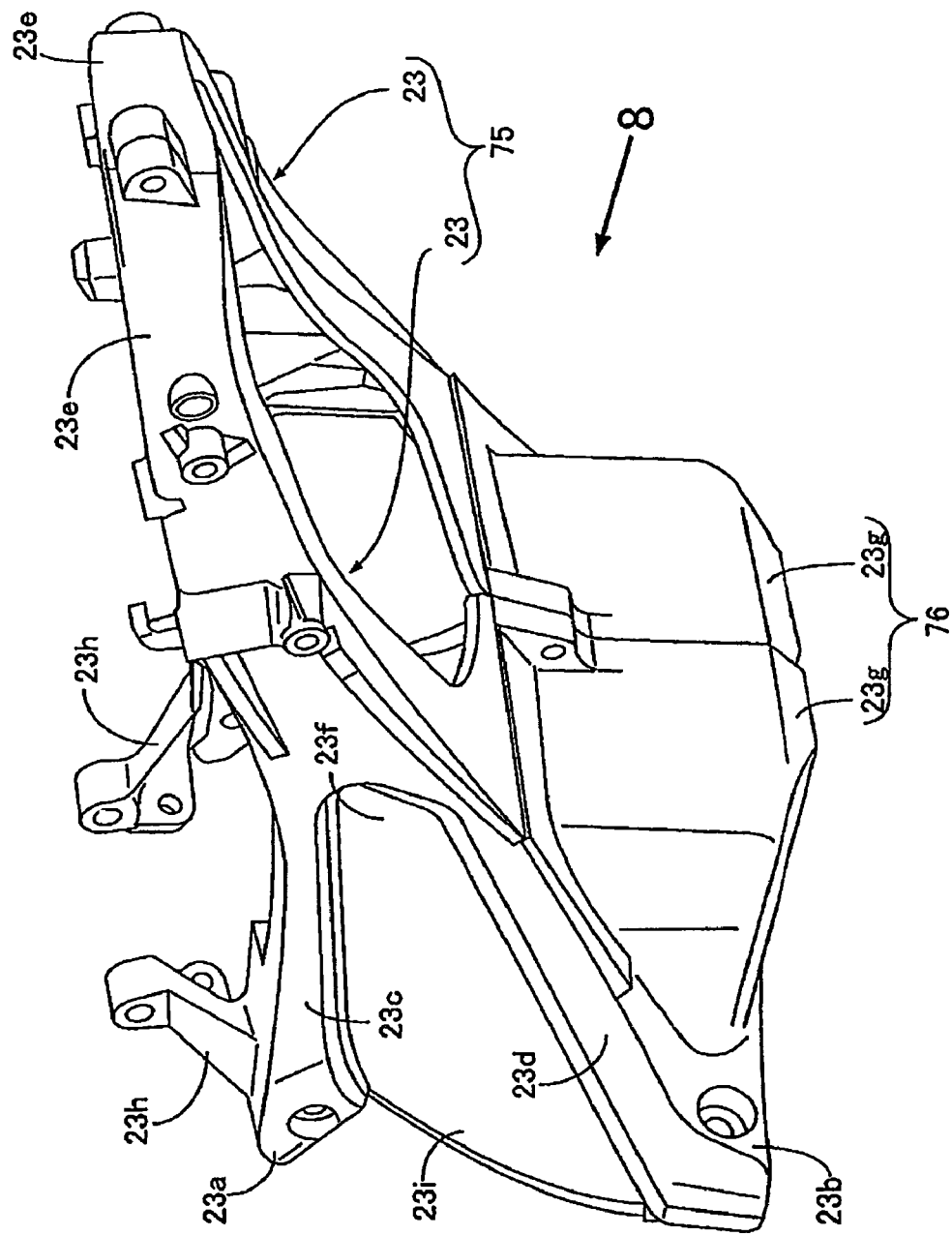
FIG. 7 is a perspective view of a seat rail assemble according to an exemplary embodiment of the present invention.
Figure 8:
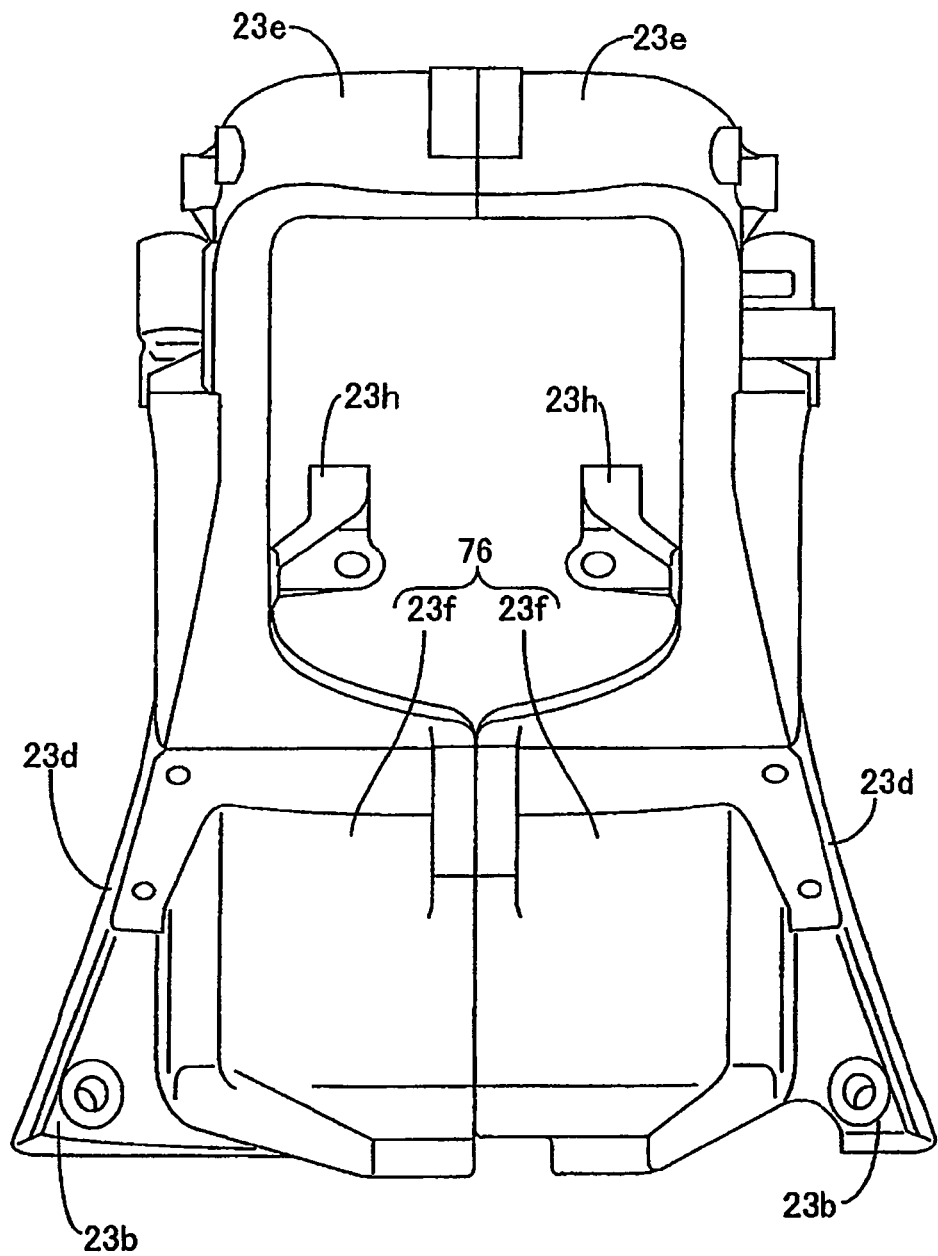
FIG. 8 is a perspective view as viewed from arrow 8 of FIG. 7.

With additional reference to FIGS. 7 and 8, the seat rail 23 integrally includes an upper frame portion 23c, a lower frame portion 23d, a rear frame portion 23e and a thin wall portion 23f. The upper frame portion 23c is provided with a first attachment portion 23a at a front end and extends rearward and upward. The lower frame portion 23d is provided with a second attachment portion 23b at a front end, extends rearward and upward, and merges with the intermediate portion of the upper frame portion 23c. The rear frame portion 23e bends inwardly from the rear end of the upper frame 23c. The thin wall portion 23f connects the front portion of the upper frame portion 23c with the lower frame portion 23d. Both the seat rails 23, 23 are joined together to constitute a seat rail assembly 75.

The seat rail assembly 75 is formed with a box-like portion 76 disposed at a position connecting a pair of the left and right second attachment portions 23b when the seat rail assembly 75 is viewed from the rear. The box-like portion 76 is formed by joining together box-like half portions 23g each provided integrally with the lower frame portion 23d of the seat rail 23 and hanging downward. The box-like portion 76 opens forward and upward and houses, e.g. an ABS modulator, etc.

Additionally, the front ends 23i of the seat rails 23 are formed to overlap the rear portion of the pivot plate 22 with the first and second attachment portions 23a, 23b fastened to the pivot plate 22.

As shown in FIG. 2, the engine main body 32 is formed as a V-type water-cooled one having a front bank BF located anteriorly and a rear bank BR located rearward of the front bank BF while mounted on the motorcycle. A crankshaft 51 extending in a vehicle-widthwise direction, i.e., in a left-right direction of the motorcycle is rotatably journaled by the crankcase 50 shared by both the banks BF, BR.

The crankcase 50 is formed by joining together an upper case half-body 50a and a lower case half-body 50b. The front bank BF and the rear bank BR are formed integrally with the upper case half-body 50a so as to be V-shaped in the back and forth direction of the body frame F. An axis of the crankshaft 51 is located on a joint surface between the upper case half-body 50a and the lower case half-body 50b.

The front bank BF includes a front cylinder block 52F integrally continuous with the upper case half-body 50a of the crankcase 50; a front cylinder head 53F joined to the front cylinder block 52F; and a front head cover F joined to the front cylinder head 53F. The rear bank BR includes a rear cylinder block 52R integrally continuous with the upper case half-body 50a of the crankcase 50; a rear cylinder head 53 joined to the rear cylinder block 52R; and a rear head cover 54R joined to the rear cylinder head 53R.

A single air cleaner 56 shared by the front and rear banks BF, BR is disposed above the engine main body 32. A pair of left and right running air introduction ducts 57 opening forward are respectively joined to both left and right sides of the air cleaner 56. A fuel tank 55 is mounted on both the main shafts 21 of the body frame F so as to cover the air cleaner 56 and the running air introduction ducts 57 from above. As shown in FIGS. 7 and 8, respective support arm portions 23h for supporting the rear portion of the fuel tank 55 are integrally provided on both the main frames 23 to extend upward from the corresponding front end portions of the upper frames 23c.

Figure 9:
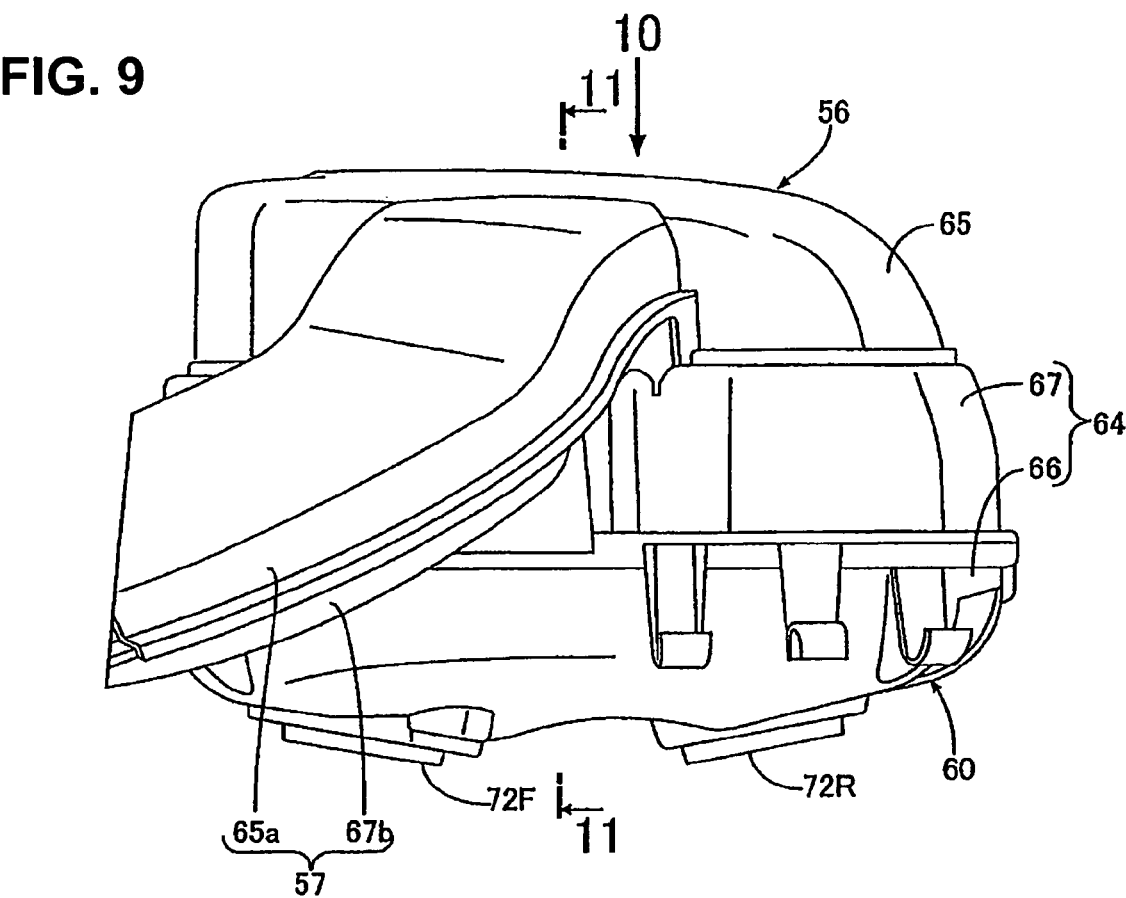
FIG. 9 is a lateral view of an air cleaner according to an exemplary embodiment of the present invention.
Figure 10:
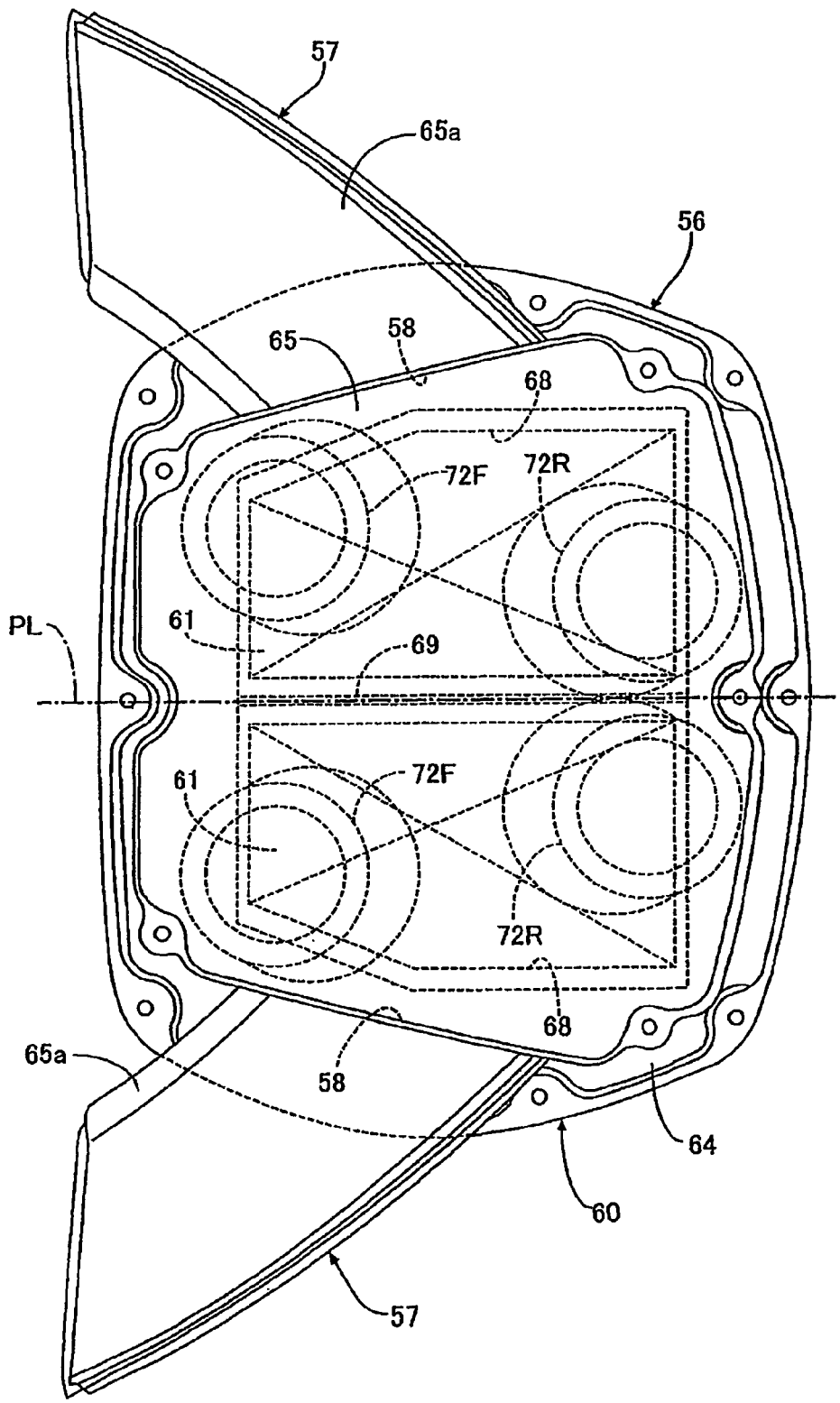
FIG. 10 is a perspective view as viewed from arrow 10 of FIG. 9.
Figure 11:
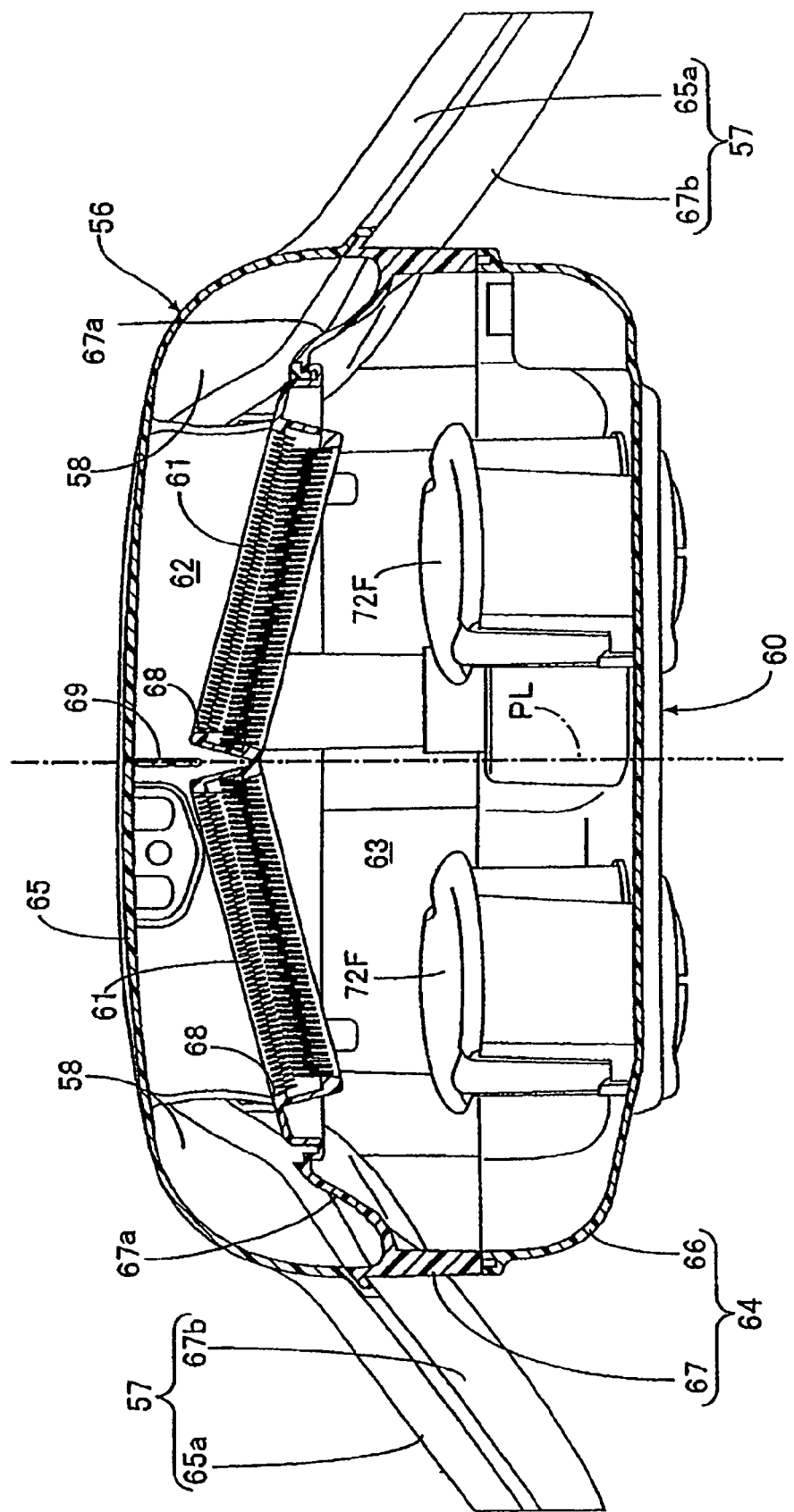
FIG. 11 is a cross-sectional view taken along line 11-11 of FIG. 9.

Referring to FIGS. 9 to 11, the air cleaner 56 includes a cleaner case 60 and a pair of cleaner elements 61, 61. The cleaner case 60 is formed in both left and right lateral walls with introduction ports 58 communicating with the corresponding running air introduction ducts 57. The cleaner elements 61, 61 are fixedly disposed in the cleaner case 60 to partition the inside thereof into an unfiltered air chamber 62 communicating to both the introduction ports 58 and a filtered air chamber 63 disposed below the unfiltered air chamber 62 and shared by the front bank BF and the rear bank BR.

The cleaner case 60 includes a lower case 64 forming a lateral wall of the filtered air chamber 63 and an upper case 65 detachably connected to the lower case 64 to form the unfiltered air chamber 62 between the lower case 64 and the upper case 65. The lower case 64 includes a first case member 66 formed like a bowl to open upward and a second case member 67 connected from above to the first case member 66 to form the filtered air chamber 63 between the first case member 66 and the second case member 67. A ceiling wall 67a of the second case member 67 is formed in a mountain-shape to grow in height toward the vertical PL including a vehicle-body centerline extending forward and rearward through the widthwise central portion of the cleaner case 60.

The ceiling wall 67a of the second case member 67 is formed with opening portions 68, 68 on both sides of the vertical PL. The cleaner elements 61 are attached to the ceiling wall 67a of the second case member 67 so as to bury the corresponding openings 68. Thus, both the cleaner elements 61 are fixedly housed inside the cleaner case 60 so as to be inclined to be gradually lowered as they are away from the vertical PL.

Both the running air introduction ducts 57 are each formed by joining together a duct half-portion 67b integrally continuous with the second case member 67 of the lower case 64 and a duct half-portion 65a integrally continuous with the upper case 65. The running air introduction ducts 57 extend forwardly and obliquely downwardly through both sides of the cleaner case 60 from introduction ports 58 provided on both lateral walls of the upper case 65 of the cleaner case 60 so as to be continuous with the unfiltered air chamber 62.

In this way, the cleaner elements 61 disposed on an incline which is gradually lowered as they are away from the vertical PL on both the sides of the vertical PL including the vehicle body centerline extending forward and rearward are made to face the introduction ports 58 of both the lateral walls of the cleaner case 60.

Further, a partition wall 69 is integrally provided on the upper inner surface of the upper case 65 at a position corresponding to between the pair of cleaner elements 61 to partition the inside of the unpurified 62 into the left and right portions corresponding respectively to both the running air introduction ducts 57.

Referring again to FIG. 2, throttle bodies 70F individually corresponding to two cylinders provided for the front bank BF are connected to the lateral wall, facing the rear bank BR, of the front cylinder head 53F in the front bank BF so as to rise upward. In addition, throttle bodies 70R individually corresponding to two cylinders provided for the rear bank BR are connected to the lateral wall, facing the front bank BF, of the rear cylinder head 53R in the rear bank BR so as to rise upward. Fuel injection valves 71F, 71R are each attached to a corresponding one of the throttle bodies 70F, 70R.

Referring to FIGS. 8 and 9, a pair of intake pipes 72F, 72F connected respectively to both the throttle bodies 70F of the front bank BF and a pair of intake pipes 72R, 72R connected respectively to both the throttle bodies 70R are attached to the bottom wall of the lower case 64, i.e., of the first case member 66 included in the cleaner case 60 of the air cleaner 56 in such a manner that their upper ends open toward the filtered air chamber 63.

A description is next given of the operation of the present exemplary embodiment. The engine main body 32, having the front and rear banks BF, BR which are V-shaped in the back and forth direction of the body frame F, is mounted on the body frame F. The single air cleaner 65 shared by the front and rear banks BF, BR includes the cleaner case 60 formed in both the left and right lateral walls with the introduction ports 58 communicating with the pair of corresponding left and right running air introduction ducts 57 opening forward, and the pair of cleaner elements 61, 61 fixedly disposed in the cleaner case 60 to partition the inside thereof into the unfiltered air chamber 62 communicating with both the introduction ports 58 and the filtered air chamber 63 disposed below the unfiltered air chamber 62 and shared by the front and rear banks BF, BR. Both the cleaner elements 61 are fixedly housed in the cleaner case 60 so as to be disposed on both the sides of the vertical PL including the vehicle body centerline extending in the back and forth direction and to be inclined to be gradually lowered as they are away from the vertical PL to face both the corresponding introduction ports 58.

Thus, running air introduced into the unfiltered air chamber 62 from the pair of left and right running air introduction ports 57 hits both the cleaner elements 61, which are equally shaped, passes through the corresponding cleaner elements 61, and flows into the filtered air chamber 63. Since the air flowing in the filtered air chamber 63 is equalized, intake air can equally be distributed into the front and rear banks BF, BR. In addition, since both the cleaner elements 61 are arranged on an incline, the filtration area can be increased without increasing the width of the cleaner case 60.

The cleaner case 60 includes the lower case 64 forming the lateral wall of the filtered air chamber 63 and the upper case 65 detachably connected to the lower case 64 to form the unfiltered air chamber 62 between the lower case 64 and the upper case 65. In addition, the partition wall 69 is integrally provided on the upper inner surface of the upper case 65 at a position corresponding to between both the cleaner elements 61 to partition the inside of the unpurified 62 into the left and right portions corresponding respectively to both the running air introduction ducts 57. Thus, running air introduced from both the running air introduction ducts 57 into the unfiltered air chamber 62 evenly passes through the cleaner elements 61 and flows toward the filtered air chamber 63.

In the body frame F, the pair of left and right main frame sections 21 extending rearward and downward from the head pipe 20 are each integrally provided with the engine hanger 27 having the front edge 27a formed to be inclined forward and upward toward the head pipe 20 and hanging downward from the intermediate portion of the main frame 21. In addition, both the main frame sections 21 are each formed with the through-hole 37 above the engine hanger 21. Thus, weight saving of the main frame sections 21 can be achieved.

In addition, the reinforcing portions 38 extending generally parallel to the front edges 27a of the engine hangers 27 are each provided in the main frame 21 so as to longitudinally traverse the through-hole 37. Therefore, the through-holes 37 can each effectively be reinforced by the reinforcing portion 38 to withstand a bending load acting on the main frame 21 with the head pipe 20 serving as a fulcrum.

The first engine support portions 28 for supporting the engine main body 32 are each provided at the lowermost portion of the engine hanger 27 formed hollow along with the main frame 21. The ribs 40A, 40B connecting the attachment bosses 39A, 39B, the first engine support portion 28 and the head pipe 20 together are provided to project from the internal surfaces of the engine hanger 27 and the main frame 21, respectively. The attachment bosses 39A and 39B are provided on both the main frame 21 and the engine hanger 27, respectively, to mount the body cover 17 thereto in this exemplary embodiment. Incidentally, the attachment boss 39A or 39B may be provided on at least a corresponding one of the main frame 21 and the engine hanger 27. Thus, the rigidity of the main frame sections 21 and of the engine hangers 27 can be ensured and the external appearance thereof can be enhanced because the ribs 40A, 40B will not be exposed to the external surfaces of the main frame sections 21 and of the engine hangers 27.

The attachment bosses 39A, 39B, 39C are provided between the rear and front frame members 33, 34 of at least one of the main frame 21 and the engine hanger 27. Thus, the attachment bosses 39A, 39B, 39C are made to function as struts of the hollow main frame 21 and engine hanger 27 to thereby enhance the rigidity of the main frame 21 and of the engine hanger 27.

The second engine support portions 29 are each provided on the extension of the reinforcing portion 38 and below the engine hanger 27; therefore, the supporting rigidity of the engine main body 32 can be enhanced.

The front end portion 23i of the seat rail 23 is fastened at two upper and lower positions to the upper portion of the pivot plate 22. In this case, the first attachment portion 23a laterally overlapping a rear upper lateral surface of the pivot plate 22 and the second attachment portion 23b disposed below the first attachment portion 23a to overlap from rearward the rear surface of the rear portion of the pivot plate 22 are provided at the front end portion 23i of the seat rail 23. The first attachment portion 23a is fastened to the pivot plate 22 with the first bolt 45 from the horizontal outside of the seat rail 23 and the second attachment portion 23b is fastened to the pivot plate 22 with the second bolt 46 from the rear side of the pivot plate 22.

With such an arrangement, a load applied to the second bolt 46 along with the load applied from the seat rail 23 from above is extremely small; therefore, the pivot plate 22 needs only to be provided with a simple screw hole 48 adapted to receive the second bolt 46 screwed thereinto, at a portion corresponding to the second attachment portion 23b. Thus, it is possible to firmly fasten the front end portion of the seat rail 23 to the pivot plate 22 while preventing a weight increase due to the increased thickness of the pivot plate 22 at a portion corresponding to the second attachment portion 23b of the seat rail 23.

The pivot plates 22 are provided with the attachment bosses 47 to which the pair of left and right attachment portions 23a are attached such that the upper cross member 35 connects both the bosses 47. The upper cross member 35 is provided with the cushion support portion 35a for supporting the upper end of the rear cushion 26. Therefore, the cushion support portion 35a sufficiently ensures the strength and rigidity and the pair of left and right bosses 47 can be commoditized to thereby ensure rigidity of the attachment portions of the seat rails 23 to the pivot plates 22 without increasing the weight.

The front end portions 23i of the seat rails 23 externally overlap the rear portion of the pivot plate 22 as viewed from the side. Therefore, the horizontal attachment rigidity of the seat rails 23 to the pivot plates 22 is increased and the pivot plate 22 can thin relative to the seat rails 23, thereby enhancing the external appearance.

Further, the pair of left and right seat rails 23 are joined together to constitute the seat rail assembly 75. The seat rail assembly 75 is formed with the box-like portion 76 disposed at a position connecting a pair of the left and right second attachment portions 23b when the seat rail assembly 75 is viewed from the rear. A load applied to the second attachment portions 23b resulting from a twist in the seat rails 23 can be reduced by action of the box-like portion 76 to reduce a load applied to the pivot plate 22, thereby further reducing the weight of the pivot plate 22.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. A motorcycle frame structure, comprising:
   a head pipe pivotally supporting a front fork and a steering handlebar operatively attached to the front fork;
   a pair of left and right main frame sections extending rearwardly and downwardly from the head pipe;
   a pair of left and right pivot plates provided at respective rear portions of the main frame sections and configured to reciprocally swingably support a front portion of a swing arm therebetween, said swing arm rotatably supporting a rear wheel at a rear portion thereof; and
   a seat rail fastened at a front end of an upper portion of the pivot plates in two positions, the two positions being vertically spaced apart from each other, wherein
   a first attachment portion laterally overlapping a rear upper lateral surface of the pivot plates and a second attachment portion disposed below the first attachment portion to overlap a rear surface of a rear portion of the pivot plates from the rear are attached to the front end of the seat rail, and
   the first attachment portion is fastened to the pivot plates from the horizontally external side of the seat rail with a first bolt, and the second attachment portion is fastened to the pivot plates from the rear side of the pivot plates with a second bolt.

2. The motorcycle frame structure according to claim 1, wherein:
   the pivot plates are provided with a pair of respective left and right bosses to which the first attachment portion is respectively attached, and with the cross member connecting both the bosses, and the cross member is formed with a cushion support portion supporting an upper end portion of the rear cushion.

3. The motorcycle frame structure according to claim 1, wherein the front end of the seat rail is formed to externally overlap a rear portion of the pivot plates as viewed from the side.

4. The motorcycle frame structure according to claim 2, wherein the front end of the seat rail is formed to externally overlap a rear portion of the pivot plates as viewed from the side.

5. The motorcycle frame structure according to claim 1, wherein a pair of the left and right seat rails are joined together to constitute a seat rail assembly, and the seat rail assembly is formed with a box-like portion disposed at a position connecting a pair of the left and right second attachment portions when the seat rail assembly is viewed from the rear.

6. The motorcycle frame structure according to claim 2, wherein a pair of the left and right seat rails are joined together to constitute a seat rail assembly, and the seat rail assembly is formed with a box-like portion disposed at a position connecting a pair of the left and right second attachment portions when the seat rail assembly is viewed from the rear.

7. The motorcycle frame structure according to claim 3, wherein a pair of the left and right seat rails are joined together to constitute a seat rail assembly, and the seat rail assembly is formed with a box-like portion disposed at a position connecting a pair of the left and right second attachment portions when the seat rail assembly is viewed from the rear.

8. The motorcycle frame structure according to claim 4, wherein a pair of the left and right seat rails are joined together to constitute a seat rail assembly, and the seat rail assembly is formed with a box-like portion disposed at a position connecting a pair of the left and right second attachment portions when the seat rail assembly is viewed from the rear.

9. The motorcycle frame structure of claim 1 further including, an engine hanger provided integrally with each of the respective left and right main frame sections and configured to extend downwardly from corresponding intermediate portions of the left and right main frame sections.

10. A motorcycle frame structure, comprising:
    a head pipe pivotally supporting a front fork and a steering handlebar operatively attached to the front fork;
    a pair of left and right main frame sections extending rearwardly and downwardly from the head pipe;
    a pair of left and right pivot plates provided at respective rear portions of the main frame sections and configured to reciprocally swingably support a front portion of a swing arm therebetween, said swing arm rotatably supporting a rear wheel at a rear portion thereof; and
    an engine hanger provided integrally with each of the respective left and right main frame sections and configured to extend downwardly from corresponding intermediate portions of the left and right main frame sections;
    an engine support portion provided at a lowermost portion of the engine hanger and cooperating with the left and right main frame sections to support an engine main body;

attachment bosses provided on at least one of the main frame sections and the engine hangers, and ribs connecting the engine support portion with the head pipe, wherein said ribs are provided projecting inwardly on respective inner surfaces of the main frame sections and the engine hangers; and a seat rail fastened at a front end of an upper portion of the pivot plates in two positions, the two positions being vertically spaced apart from each other, wherein a first attachment portion laterally overlapping a rear upper lateral surface of the pivot plates and a second attachment portion disposed below the first attachment portion to overlap a rear surface of a rear portion of the pivot plates from the rear are attached to the front end of the seat rail, and the first attachment portion is fastened to the pivot plates from the horizontally external side of the seat rail with a first bolt, and the second attachment portion is fastened to the pivot plates from the rear side of the pivot plates with a second bolt.

11. The motorcycle frame structure according to claim 10, wherein:

the pivot plates are provided with a pair of respective left and right bosses to which the first attachment portion is respectively attached, and with the cross member connecting both the bosses, and the cross member is formed with a cushion support portion supporting an upper end portion of the rear cushion.

12. The motorcycle frame structure according to claim 10, wherein the front end of the seat rail is formed to externally overlap a rear portion of the pivot plates as viewed from the side.

13. The motorcycle frame structure according to claim 11, wherein the front end of the seat rail is formed to externally overlap a rear portion of the pivot plates as viewed from the side.

14. The motorcycle frame structure according to claim 10, wherein a pair of the left and right seat rails are joined together to constitute a seat rail assembly, and the seat rail assembly is formed with a box-like portion disposed at a position connecting a pair of the left and right second attachment portions when the seat rail assembly is viewed from the rear.

15. The motorcycle frame structure according to claim 11, wherein a pair of the left and right seat rails are joined together to constitute a seat rail assembly, and the seat rail assembly is formed with a box-like portion disposed at a position connecting a pair of the left and right second attachment portions when the seat rail assembly is viewed from the rear.

16. The motorcycle frame structure according to claim 11, wherein a pair of the left and right seat rails are joined together to constitute a seat rail assembly, and the seat rail assembly is formed with a box-like portion disposed at a position connecting a pair of the left and right second attachment portions when the seat rail assembly is viewed from the rear.

17. The motorcycle frame structure according to claim 12, wherein a pair of the left and right seat rails are joined together to constitute a seat rail assembly, and the seat rail assembly is formed with a box-like portion disposed at a position connecting a pair of the left and right second attachment portions when the seat rail assembly is viewed from the rear.

18. The motorcycle frame structure according to claim 13, wherein a pair of the left and right seat rails are joined together to constitute a seat rail assembly, and the seat rail assembly is formed with a box-like portion disposed at a position connecting a pair of the left and right second attachment portions when the seat rail assembly is viewed from the rear.

* * * * *